United States Patent [19]

Fulmer, Sr.

[11] 4,073,417

[45] Feb. 14, 1978

[54] VEHICULAR ANTENNA HOLD DOWN BRACKET

[75] Inventor: Leon F. Fulmer, Sr., Newberry, S.C.

[73] Assignee: Shakespeare Company, Columbia, S.C.

[21] Appl. No.: 691,498

[22] Filed: June 1, 1976

[51] Int. Cl.$^2$ .............................................. B60R 11/00

[52] U.S. Cl. ............................. 224/42.1 G; D12/155; 174/138 A; 224/29 R; 224/42.45 R; 248/316 D; 343/713

[58] Field of Search ....... 224/29 R, 42.45 R, 42.03 R, 224/42.1 G, 42.1 R, 42.46 R, 42.43; 248/226 E, 226 R, 316 D, 214, 237, 301, 304, 503; 24/81 CC, 81 R; D12/155; D8/259, 230; 343/713, 716, 711, 709; 174/138 A, 175; 325/111, 112, 117, 118, 312, 354

[56] References Cited

U.S. PATENT DOCUMENTS

| | | | |
|---|---|---|---|
| 1,113,918 | 10/1914 | Trenowith | 248/226 E X |
| 2,097,707 | 11/1937 | Tichenor | 174/138 A X |
| 2,368,174 | 1/1945 | Thomas et al. | 174/138 A X |
| 2,495,848 | 1/1950 | Kiesel | 248/316 D UX |
| 2,578,067 | 12/1951 | Jensen | 248/316 D UX |
| 2,807,398 | 9/1957 | Mathews | 224/42.1 G |
| 3,193,229 | 7/1965 | Stock | 248/316 D X |

*Primary Examiner*—Trygve M. Blix
*Assistant Examiner*—Jerold M. Forsberg
*Attorney, Agent, or Firm*—Hamilton, Renner & Kenner

[57] ABSTRACT

Disclosed is a unitary bracket for holding down an antenna mounted on a vehicle. The bracket includes an elongate body portion having one end configured to be readily clipped onto the gutter strip of the vehicle. The other end of the body portion is configured to receive and hold the antenna in a position generally paralleling the roof line of the vehicle. Because different styles of vehicles have different sized gutter strips, the end of the body portion which is clipped onto the strip can be made universally adaptable to the various sized strips.

4 Claims, 2 Drawing Figures

VEHICULAR ANTENNA HOLD DOWN BRACKET

BACKGROUND OF THE INVENTION

This invention relates to a bracket for holding a vehicle-mounted antenna down generally along the profile of the vehicle. More particularly, the invention relates to a one-piece bracket which is universally adapted to clip onto the gutter strip of most vehicles.

Attendant to the ever-increasing usage of Citizen's Band (CB) radios by operators of vehicles is the necessity of an extra antenna for use therewith. Many such antennas, particularly those of higher sensitivity, are flexible and quite long with a typical length being on the order of one hundred inches. As such, there is a need to prevent damage to the antenna when it is not in use or when the vehicle is traveling in low clearance areas such as a garage or the like.

To this end certain antenna mounts are made such that the antenna itself is removable or some type of bracket can be provided, usually mounted on the gutter strip running along the roof line of most vehicles, to hold the antenna down against the profile of the car thereby permitting the desired overhead clearance. The prior art as to these brackets generally is of a three-piece construction with two metallic pieces being utilized to engage the gutter strip and a plastic piece being attached to one of the metallic pieces to hold and insulate the antenna. Most often the two metallic pieces are attached by a screw or the like with the gutter strip being clamped therebetween. Similarly, the plastic antenna holder is affixed to one of the metallic pieces by another fastener. The plastic holder is usually provided with a keyhole-shaped aperture into which the flexed antenna can be threaded.

These prior art devices are not without their shortcomings. They are not easy to install, requiring tools and the assemblage of a number of parts. The metallic pieces must be tightly clamped around the gutter strip, which is not always easy in view of the various configurations of these strips. Such tedious operation and the continual metal-to-metal contact will often mar the finish on the vehicle. In addition, the metallic pieces will rust or otherwise become unsightly when exposed to prolonged weather conditions and will often loosen under vehicular vibration or pressure from the flexed antenna.

SUMMARY OF THE INVENTION

It is thus a primary object of the present invention to provide a vehicular antenna hold down bracket of a one-piece nonmetallic construction.

It is another object of the present invention to provide a bracket, as above, which is easy to install on the gutter strip of a vehicle without the necessity of using tools to do so.

It is yet another object of the present invention to provide a bracket, as above, which will fit onto the gutter strip of most any vehicle regardless of the specific configuration thereof.

It is a further object of the present invention to provide a bracket, as above, which will remain securely in place by the tension provided by the flexed antenna.

It is still another object of the present invention to provide a bracket, as above, which will not mar the vehicular finish or become unsightly due to prolonged exposure to weather conditions.

These and other objects of the present invention, which will become apparent from the description of the preferred embodiment, are accomplished by the means hereinafter described and claimed.

In general, a unitary bracket for holding down an antenna mounted on a vehicle includes an elongate body portion which is configured at one end to readily clip onto the gutter strip of the vehicle. The other end of the body portion is configured to receive and hold the flexed antenna.

DESCRIPTION OF THE PREFERRED EMBODIMENT

Figure 1:
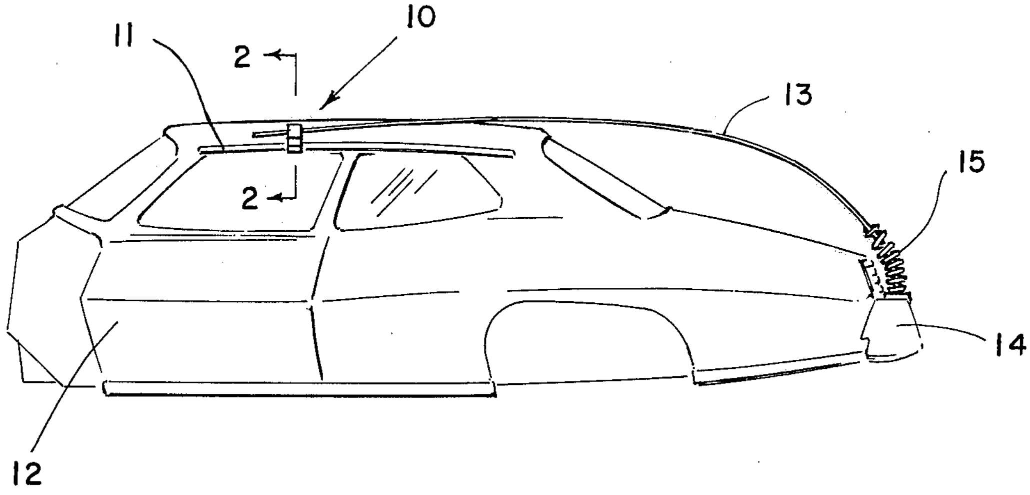
FIG. 1 is an elevational view of a portion of a vehicle showing an antenna mounted on the rear bumper thereof and the bracket of the present invention mounted on the gutter strip of the vehicle and holding the flexed antenna.

The bracket for holding down a vehicular antenna is indicated generally by the numeral 10 and shown in FIG. 1 as being mounted on a gutter strip 11 which runs along the roof line of a vehicle 12. A flexible antenna 13, such as would be used for a CB radio, is shown as being mounted on the rear bumper 14 of vehicle 12 with a conventional antenna mount 15. It is to be understood that bracket 10 could be utilized with many types of antennas mounted by various styles of mounts at various locations on the vehicle, the bumper mounting being chosen herein as most typical for the longer, more sensitive antenna shown. In addition, it should be noted that any type of mount 15 which would be amenable to the flexing of antenna 13, such as a spring mount or other bumper mount known to those skilled in the art, would be suitable.

Figure 2:
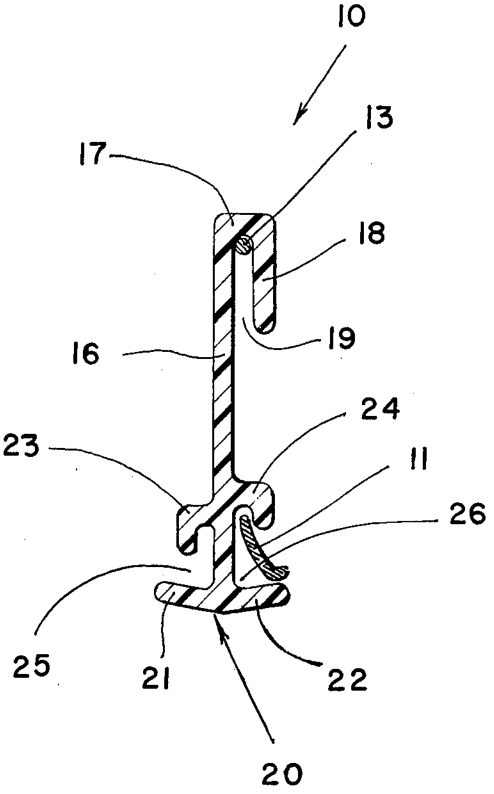
FIG. 2 is an enlarged sectional view taken through the bracket along line 2—2 of FIG. 1.

As shown in FIG. 2, bracket 10 is of unitary or one-piece construction and may be made of many types of plastic materials such as filled or unfilled thermoset or thermoplastic, with high density polyethylene being typical. Such plastics may be fabricated by any of the well known processes such as injection, compression, transfer or blow molding; extrusion; pultrusion; mechanical forming; or casting.

Bracket 10 includes an elongate body portion 16 which extends generally vertically from the vehicle when bracket 10 is mounted on gutter strip 11. The upper end of body portion 16 terminates in an antenna restraining portion 17 extending generally transversely of body portion 16. A hook portion 18 extends downwardly from the end of restraining portion 17 and generally parallels body portion 16 to form with restraining portion 17 and body portion 16 a slot 19 through which the antenna may extend.

The other end of body portion 16 terminates in an anchor member 20 which includes in the preferred form two wedge flanges 21 and 22 extending from opposite sides of body portion 16. As will hereinafter become evident, it is desirable that each wedge flange extend from body portion 16 at an acute angle. Although it has been found that an angle of about 80° is most desirable, an angle in the range of 70° to 80° would be satisfactory.

Two fluke or hook portions 23, 24 extend from opposite sides of body portion 16 somewhat above and opposed to wedge flanges 21 and 22, respectively. Together with wedge flanges 21, 22, fluke portions 23, 24 form recesses 25, 26 for receiving gutter strip 11 therebetween. As shown, because fluke 23 is closer to wedge flange 21 than fluke 24 is to wedge flange 22, recess 25 is of a lesser longitudinal or vertical extent than recess 26. It has been found that the gutter strips 11 on many vehicles vary from manufacturer to manufacturer and dependent on the style and decor of the vehicle. Thus, by providing bracket 10 with two possible mountings for the gutter strip, essentially all models and styles of vehicles will be accommodated. It has been particularly found that recess 26 will accommodate the gutter strips of most American made vehicles while recess 25 will be suitable for many foreign made vehicles as well as many American vehicles having special decor such as a vinyl roof or the like.

In order to install bracket 10 on a vehicle it is only necessary to first determine whether recess 25 or 26 will be best suited for the gutter strip 11 of the particular vehicle involved. Assuming, as shown in the drawings, that recess 26 is so suited, bracket 10 may be positioned thereon, usually somewhat midway of the roofline, by first hooking fluke 24 over the top of strip 11. Then a slight outward force on gutter strip 11 establishes a locking engagement as wedge portion 22 fits under or near the bottom of strip 11. On some vehicles it is also possible to thread bracket 10 onto strip 11 at one end thereof and merely slide the bracket along the strip until reaching the desired location. In either case most often the body portion 16 of bracket 10 will be held generally vertically merely by the clamping engagement of the opposed fluke and wedge flange. However, when the antenna is flexed and threaded within slot 19, the tendency of the antenna to revert to its unflexed condition provides ample tension to hold bracket 10 in a generally vertical and fixed position.

It should thus be evident that a bracket constructed according to the concept of the present invention, as described herein, accomplishes the objects of the present invention and otherwise substantially improves the vehicular antenna hold down art.

I claim:

1. A unitary bracket for holding down a flexible antenna of the type mounted on vehicles, the vehicles having gutter strips thereon the configuration of which may vary from vehicle to vehicle, the bracket comprising an elongate body portion, first fluke means formed on one end of said body portion and engagable with the top of a gutter strip of a first configuration, first wedge means opposed to said first fluke means and engagable with the gutter strip of said first configuration near the bottom thereof to form with said first fluke means a recess for the gutter strip of said first configuration, second fluke means formed on said one end of said body portion and engagable with the top of a gutter strip of a second configuration, second wedge means opposed to said second fluke means and engagable with the gutter strip of said second configuration near the bottom thereof to form with said second fluke means a recess for the gutter strip of said second configuration, said recess for the gutter strip of said second configuration being of lesser longitudinal extent than said recess for the gutter strip of said first configuration, and means formed on the other end of said body portion adapted to receive and hold the antenna.

2. A unitary bracket according to claim 1 wherein said means adapted to receive and hold the antenna includes hook means extending generally parallel to said body portion and antenna restraining means between said hook means and said body portion, said hook means, antenna restraining means and body portion forming a slot within which the antenna may be received.

3. A unitary bracket according to claim 1 wherein said first wedge means extends from said body portion at an angle of approximately 80°.

4. A unitary bracket according to claim 1 wherein said second fluke means and second wedge means extend from said body portion on the opposite side thereof as do said first fluke means and said first wedge means.

* * * * *